UNITED STATES PATENT OFFICE 2,265,221

PYRAZOLONE DERIVATIVES

Hans Zischler, Bitterfeld, Germany, assignor, by mesne assignments, to General Aniline & Film Corporation, New York, N. Y., a corporation of Delaware No Drawing. Application August 9, 1939, Serial No. 289,173. In Germany August 20, 1938

6 Claims. (Cl. 260—310)

A known process for making pyrazolone derivatives consists in causing a β-keto-carboxylic acid ester to react with hydrazine, aryl hydrazine or alkyl hydrazine.

This invention relates to the production of N-(1)-alkyl-sulfonic acid pyrazolone derivatives of the general formula

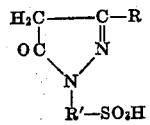

wherein R=alkyl, for instance methyl-, ethyl-, butyl-, hexyl-, stearyl-, stearoyl, aryl, for instance phenyl- or naphthyl-, or aralkyl for instance benzyl and R'=alkylene or hydroxalkylene by condensing an aromatic or aliphatic β-keto-carboxylic acid ester with a hydrazinoalkylsulfonic acid.

The hydrazinoalkylsulfonic acids may be made by the process described in U.S. patent application Ser. No. 289,172 filed by Gustav Wilmanns and the present applicant on August 9, 1939 by reacting hydrazinehydrate with alkylenesulfonic acids for instance when hydrazine hydrate is added to ethane sulfonic acid, hydrazinoethane sulfonic acid is obtained. Thus 1 mol of sodium vinyl sulfonate is dissolved in 600 cc. of water, the solution mixed with 100 cc. of hydrazine hydrate and the mixture heated for six hours on the steam bath. To remove the excess of hydrazine, 1 mol of benzaldehyde is added and the benzalazine then formed is filtered. Another mol of benzaldehyde is added and the benzaldehyde compound of the hydrazino ethane sulfonic acid is precipitated, by acidifying with concentrated hydrochloric acid, in the form of crystals melting at 200° C. The free sulfonic acid may be obtained by mixing 1 mol of the benzaldehyde compound with 100 cc. of concentrated hydrochloric acid and steam distilling the mixture.

The hydrazine compounds are generally isolated in the form of their benzaldehyde addition products.

I have further found, that it is not necessary to isolate the free hydrazino alkylsulfonic acids but that the solutions obtained by splitting the benzal-compounds thereof can be used. The process therefore is of considerable advantage in view of its simplicity.

The pyrazolone derivatives thus obtained are valuable intermediate products, for instance for making dyestuffs, particularly such as are of importance in producing color pictures by color forming development, the dyestuff component being present either in the photographic layer in which case it is rendered fast to diffusion by suitable substitution, or in the developer.

The term "monovalent hydrocarbon radical" as used herein has the meaning usual in the art, i. e. a radical consisting of carbon and hydrogen.

The following examples illustrate the invention:

Example 1

An aqueous suspension of the benzaldehyde compound of hydrazino ethyl sulfonic acid of the formula

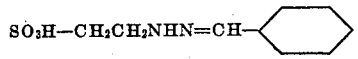

is rendered acid reacting and steam distilled until no further benzaldehyde passes over. To the solution thus obtained and containing 1 mol of the sulfonic acid compound there is added an alcoholic solution of 1 mol of para-nitrobenzoyl-acetic acid ester of the formula

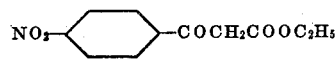

and the mixture is boiled under reflux for 6 hours. On cooling the 3-(para-nitrophenyl)-pyrazolone-(5)-1-ethane sulfonic acid of the formula

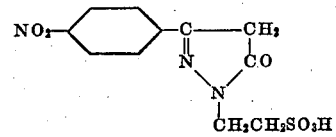

separates in the form of a yellow crystalline magma the course of the reaction may be graphically depicted as follows:

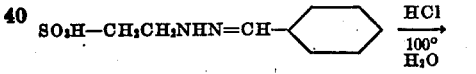

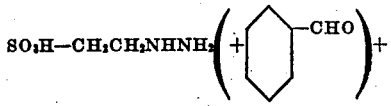

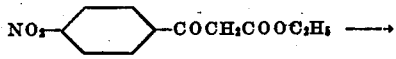

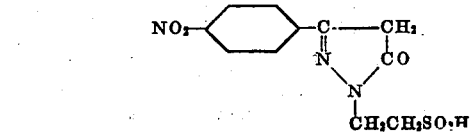

Example 2

By using acetoacetic acid ester instead of para-nitrobenzene acetic ester in the process of Example 1 there is obtained 3-methylpyrazolone-(5)-1-ethane sulfonic acid of the formula

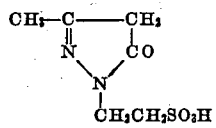

Example 3

By using stearylacetic acid ester of the formula $C_{17}H_{35}COCH_2COOC_2H_5$ instead of para-nitrobenzoylacetic acid ester in the process of Example 1 there is obtained 3-heptadecylpyrazolone-(5)-1-ethane-sulfonic-acid of the formula

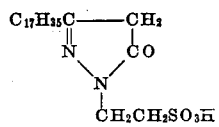

Example 4

An aqueous suspension of 1 mol of the benzaldehyde compound of 1 hydrazino-2-hydroxy-propane-3-sulfonic acid of the formula

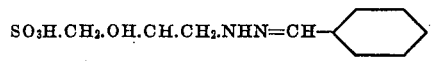

is steam-distilled after the addition of enough acid, until no more benzaldehyde passes over. To the solution thus obtained there is added an alcoholic solution of 1 mol p-nitrobenzoylacetic acid ester and the solution is heated under reflux for several hours. On cooling 3-(para-nitrophenyl)-pyrazolone-(5)-1-propanol-(2')-sulfonic acid-(3') of the formula

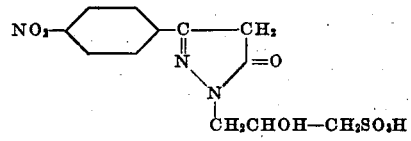

separates.

Example 5

If instead of para-nitrobenzoylacetic acid ester there is used in Example 4 acetoacetic acid ester, there is obtained 3-methylpyrazolone-(5)-1-propanol-(2')-sulfonic acid-(3') of the formula

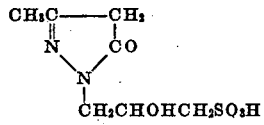

Example 6

If instead of para-nitrobenzoylacetic acid ester there is used in Example 4 stearylacetic acid ester there is obtained 3-heptadecylpyrazolone-(5)-1-propanol-(2')-sulfonic acid-(3') of the formula

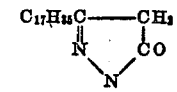

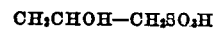

I claim:

1. The process of producing pyrazolone compounds which comprises condensing an acyl acetic acid ester with a primary hydrazino monoalkyl-sulfonic acid having at least two carbon atoms in the alkyl group, said alkyl group being taken from the class consisting of alkyl hydrocarbon radicals and hydroxy alkyl radicals.

2. The process of producing pyrazolone compounds which comprises reacting the aqueous solution obtained by splitting with acid the benzal compound of a primary hydrazino monoalkyl-sulfonic acid having at least two carbon atoms in the alkyl group, said alkyl group being taken from the class consisting of alkyl hydrocarbon radicals and hydroxy alkyl radicals, and steam distilling with an acyl acetic acid ester.

3. A compound having the following general formula:

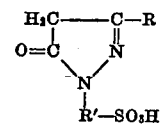

wherein R is selected from the class consisting of monovalent hydrocarbon radicals and nitro-aryl radicals, R' is an alkylene group having at least two carbon atoms, said alkylene group being taken from the class consisting of alkylene hydrocarbon radicals and hydroxy alkylene radicals.

4. 3-methylpyrazolone (5)-1-ethane-sulfonic acid.

5. 3-heptadecylpyrazolone-(5)-1-ethane-sulfonic acid.

6. 3-(para-nitrophenyl)-pyrazolone-(5)-1-propanol-(2') sulfonic acid (3').

HANS ZISCHLER.